(12) United States Patent
Kim et al.

(10) Patent No.: US 6,498,810 B1
(45) Date of Patent: Dec. 24, 2002

(54) METHOD FOR MOTION VECTOR CODING OF MPEG-4

(75) Inventors: Hyun Mun Kim, Seoul (KR); Jong Beom Ra, Taejeon-si (KR); Sung Deuk Kim, Taejeon-si (KR); Young Su Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/065,578

(22) Filed: Apr. 24, 1998

(30) Foreign Application Priority Data

Sep. 12, 1997 (KR) .............................. 97-47149

(51) Int. Cl.[7] ................................. H04B 1/66

(52) U.S. Cl. .................. 375/240; 375/240; 375/240.16; 375/240.24; 382/232; 382/236; 382/238

(58) Field of Search .......................... 375/240.16, 240, 375/240.24; 348/699, 416, 413, 243, 405; 382/232, 236, 238

(56) References Cited

U.S. PATENT DOCUMENTS

| | | | | |
|---|---|---|---|---|
| 5,608,458 A | * | 3/1997 | Chen et al. .................. | 348/413 |
| 5,691,770 A | * | 11/1997 | Keesman et al. ........... | 348/405 |
| 5,731,840 A | * | 3/1998 | Kikuchi et al. ............. | 348/416 |
| 5,818,536 A | * | 10/1998 | Morris et al. ............... | 348/416 |
| 6,047,088 A | * | 4/2000 | Van Beck et al. .......... | 382/243 |
| 6,289,049 B1 | * | 9/2001 | Kim et al. ............. | 375/240.16 |

FOREIGN PATENT DOCUMENTS

| | | |
|---|---|---|
| JP | 02-065583 | 3/1990 |
| JP | 08-168054 | 6/1996 |

OTHER PUBLICATIONS

Avideh Zakhor, "Iterative Procedures for Reduction of Blocking Effects In Transform Image Coding", IEEE Transactions On Circuits and Systems For Video Technology, vol. 2, No. 1, pp. 91–95 (Mar. 1992).

Yongyi Yang et al., "Regularized Reconstructions to Reduce Blocking Artifacts of Block Discrete Cosine Transform Compressed Images", IEEE Transactions On Circuits and Systems For Video Technology, vol. 3, No. 6, pp. 421–432 (Dec. 1993).

Gary J. Sullivan et al., "Motion Compensation for Video Compression Using Control Grid Interpolation", IEEE International Conference, pp. 2713–2716 (1991).

G. de Haan et al., "IC For Motion–Compensation 100Hz TV With Natural–Motion Movie–Mode", IEEE Transactions On Consumer Electronics, vol. 42, pp. 165–174 (Feb. 1996).

Taner Özcelik et al., "Image and Video Compression Algorithms Based on Recovery Techniques Using Mean Field Annealing", Proceedings of the IEEE, vol. 83, No. 2, pp. 304–316, Feb. 1995.

Yasuyuki Nakajima et al., "A PEL Adaptive Reduction of Coding Artifacts for MPEG Video Signals", pp. 928–932, IEEE, 1994.

* cited by examiner

*Primary Examiner*—Chris Kelley
*Assistant Examiner*—Shawn S. An
(74) *Attorney, Agent, or Firm*—Fleshner & Kim, LLP (57) ABSTRACT

A method for motion vector coding of an MPEG-4 includes determining motion vector candidates, and selecting a candidate having a minimum bit rate among motion vector candidates in an encoder. A motion vector prediction error and prediction mode information and then to a decoder. The decoder estimates a minimum bit rate for coding a motion vector difference and codes a motion vector against components X and Y, using a minimum rate predictor.

24 Claims, 6 Drawing Sheets

BLOCK 1 (MVD)

FIG.2b
background art

BLOCK 2 (MVD₂)

FIG.2c
background art

BLOCK 3 (MVD$_3$)

FIG.2d
background art

BLOCK 4 (MVD$_4$)

F I G.3
background art

× MOTION VECTOR PREDICTION INSIDE OF BOUND

○ MOTION VECTOR PREDICTION CANDIDATE OF RELEVANT BLOCK

⊚ MEDIAN PREDICTION OF MOTION VECTOR

FIG. 4

| MVDx min rate | MODEx | MVDy min rate | MODEy |
|---|---|---|---|
| | (0~2bits) | | (0~2bits) |

FIG. 5A

MV1=0, MV2=0, MV3=3, MV=5
Minimum rate predictor=MV3

FIG. 5B

MVD min rate of candidate 1=−1
MV=candidate 2
Mode bit is unnecessary

FIG.6

METHOD FOR MOTION VECTOR CODING OF MPEG-4

BACKGROUND OF THE INVENTION

1. Field of the Invention

The present invention relates to a coding method, and in particular, to a method for motion vector coding of a moving picture experts group-4 (MPEG-4) video verification model (VM).

2. Background of the Related Art

Redundancy in a temporal domain of image data and redundancy in a two dimensional spatial domain of image data must be removed to efficiently compress a video sequence that changes with time. A discrete cosine transform (DCT) is used to remove the redundancy in the two dimensional spatial domain, and a motion compensation method is used to remove the redundancy in the temporal domain in the MPEG.

The DCT is a method of removing the correlation between data through a two dimensional spatial transformation. After a picture is divided into blocks, each block in the picture is spatially transformed using the DCT. Data, which has been spatially transformed, tends to be driven to a certain direction.

Pictures, which are consecutive in the temporal domain, generally form motions of a human being or an object at the center of the frame. This property is used to remove the redundancy of the temporal domain in the motion compensation method. The volume of data to be transmitted can be minimized by taking out the similar region from the preceding picture and filling a region that has not changed (or has very little change) in the present picture with the similar region of the preceding picture. The operation of finding the most similar blocks between pictures is called motion estimation. The displacement representing the degree of motion is called a motion vector. The motion vector is two dimensional vector that is an offset between the coordinates of a reference frame or a reference field and the coordinates of a present picture or field for motion compensation of the picture.

An 8×8 block search for integer pixel motion estimation is performed inside of a search window of ±2½ pixels based on a 16×16 motion vector in the MPEG-4. When FIG. 1 a particular macroblock is established to an 8×8 mode, respective motion vectors against the four blocks in the macroblock are within a specified bound.

Figure 1:
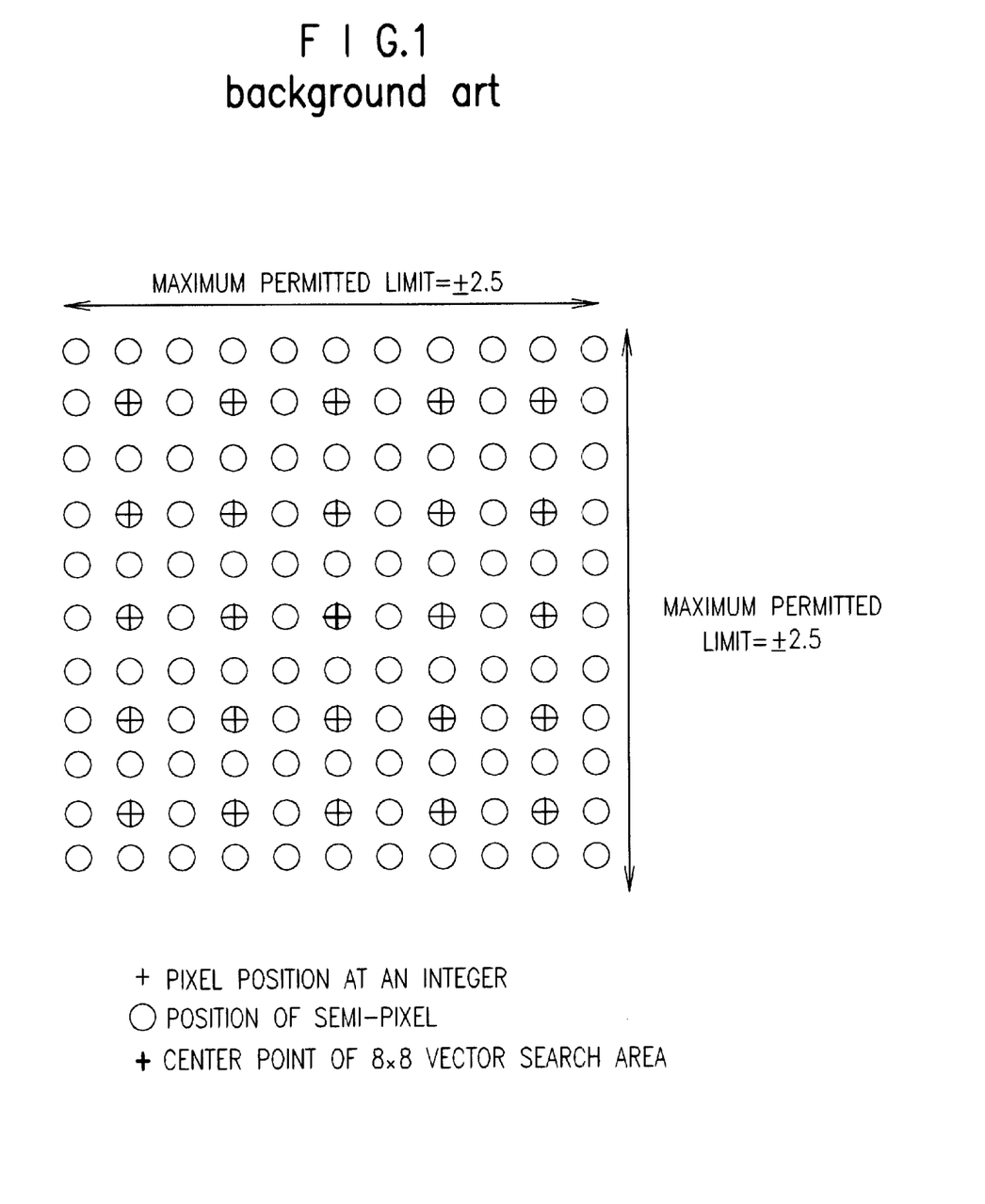
FIG. 1 is a diagram showing a bound that motion vectors of four blocks can indicate when a macroblock is established to an 8×8 mode according to the related art.
Figure 2A:
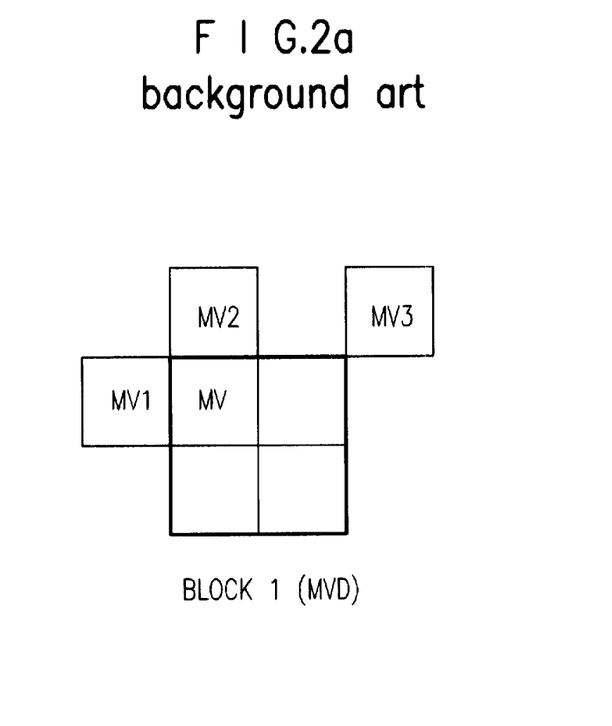
FIGS. 2a to 2d are diagrams showing motion vector candidates in an 8×8 mode macroblock according to the related art.
Figure 2B:
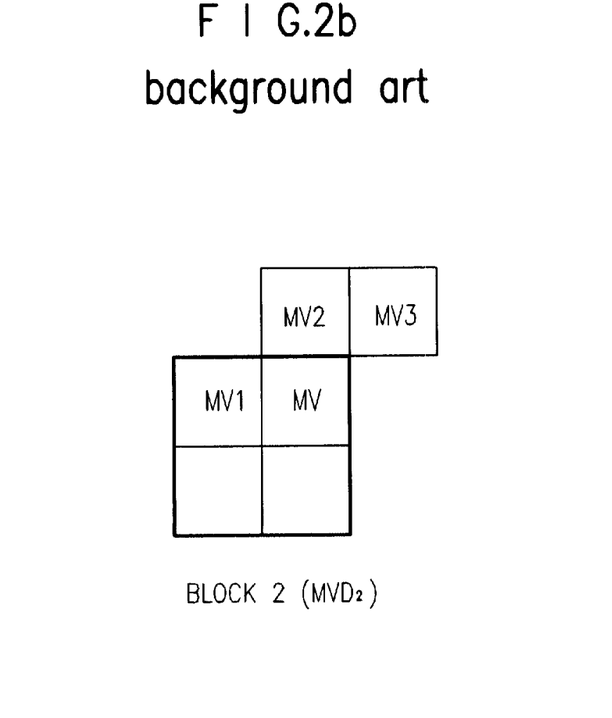
Figure 2C:
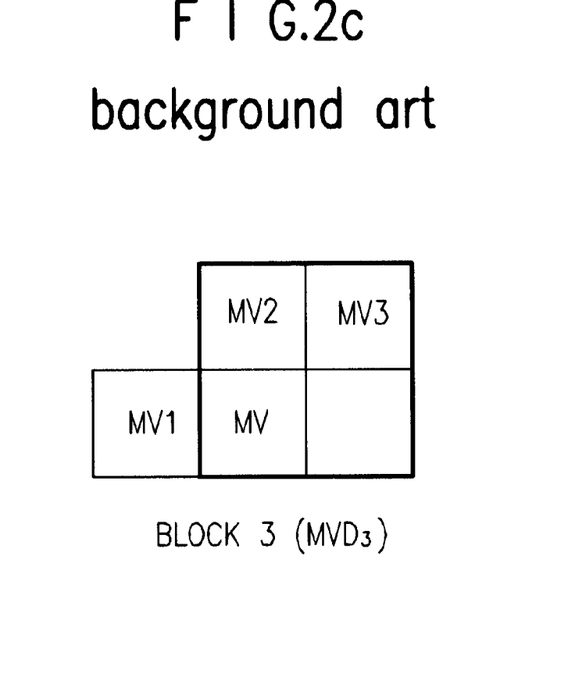
Figure 2D:
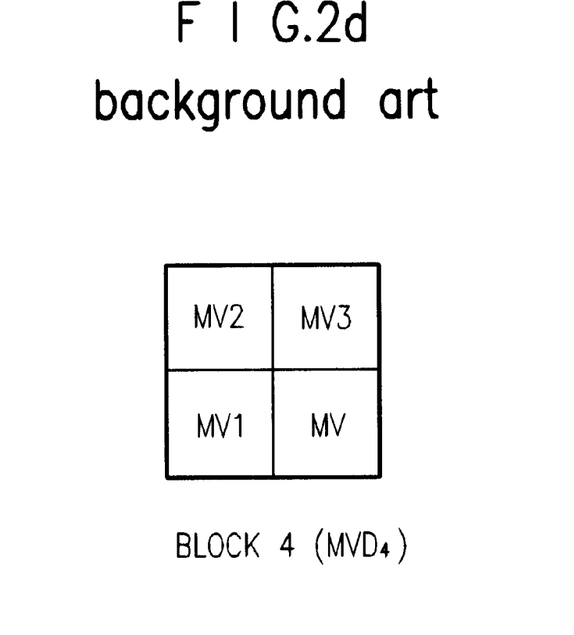

FIG. 1 shows a bound that motion vectors of the four blocks can indicate when a macroblock is established in the 8×8 mode according to the related art. This bound of the four motion vectors greatly contributes to increasing the coding efficiency of the motion vector. Four motion vectors are maximum permissible inside of the macroblock. When transmitting the four motion vectors, the amount of bits is great. The amount of bits can be decreased by performing variable length coding (VLC) to transmit only a motion vector difference from a motion vector of the preceding macroblock. The difference between successive motion vectors is expressed as a motion vector difference (MVD).

As shown in FIGS. 2a to 2d, an actual motion vector of a block (e.g., an 8×8 block) is estimated using a difference ($MVD_X$, $MVD_Y$) between a median of three neighboring motion vector candidates and a motion vector of the relevant block. This can be expressed by the following equation:

$P_X$=Median($MV1_X$, $MV2_X$, $MV3_X$), $P_Y$=Median($MV1_Y$, $MV2_Y$, $MV3_Y$), $MVD_X$=$MV_X$–$P_X$, $MVD_Y$=$MV_Y$–$P_Y$.

FIG. 1 illustrates a limit of motion vector estimation. The motion vector estimation limit shown in FIG. 1 cannot completely support an MPEG-4 VM for the following reasons.

For motion vector estimation candidates in an 8×8 mode macroblock shown in FIGS. 2a–2d, a case of a motion vector used as a median prediction that exceeds the limit of a motion vector in the 8×8 mode is related to MVD2 corresponding to block 2. Since only one of three motion vector candidates is inside of the macroblock in the 8×8 mode, the absolute value of MVD2, which is obtained from the prediction established by the median, can exceed the limit of 5.0.

Figure 3:
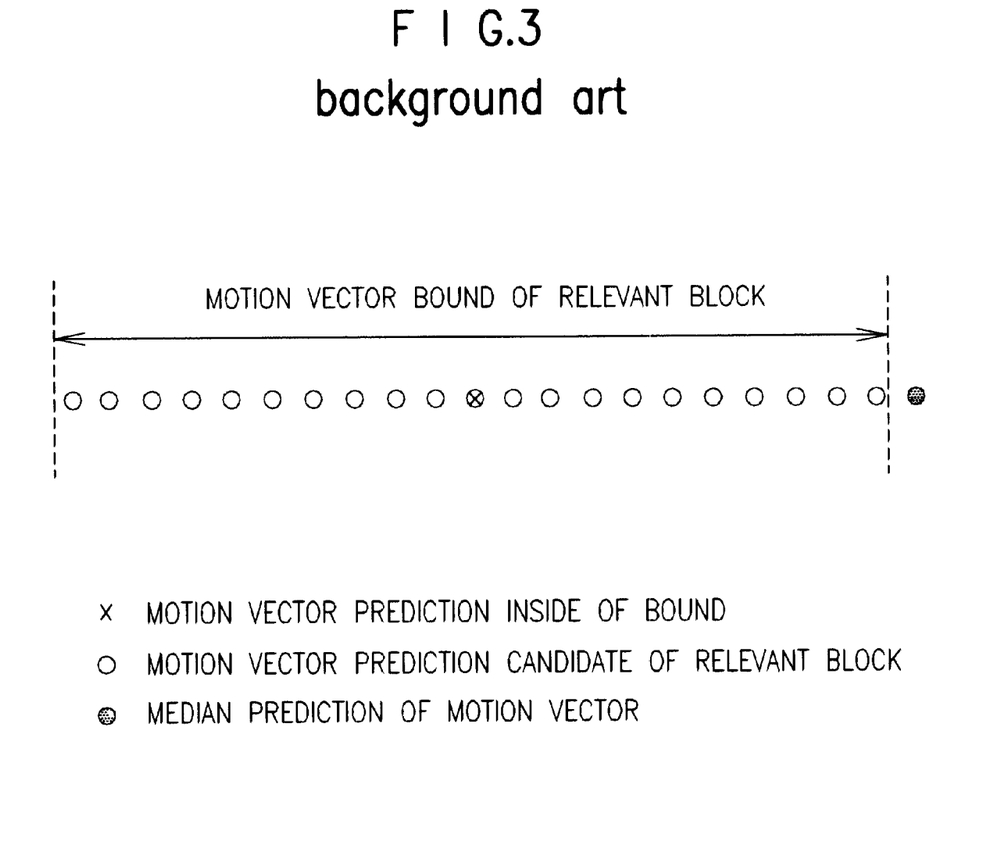
FIG. 3 is a diagram showing a case that a motion vector median prediction exceeds a limit according to the related art.

Thus, there can be a case that the prediction established by the median is out of the limit. When defining MV of block 2 as $M_{BLOCK}$ (a motion vector of a relevant block), MV1 of block 2 as $MV_{INSIDE\ MV\ PREDICTION}$ (a motion vector prediction inside a bound), and Median(MV1, MV2, MV3) of block 2 as $MV_{MEDIAN\ PREDICTION}$. FIG. 3 illustrates the case that a motion vector median prediction $MV_{MEDIAN\ PREDICTION}$ exceeds a limit.

As described above, the related art method for motion vector coding uses a median of three neighboring motion vector candidates to estimate one motion vector. However, since this method uniformly estimates all pixels based upon the median of the three neighboring motion vector candidates, there is a problem that motion vector median prediction can exceed a predetermined limit. In addition, there is a problem that coding efficiency significantly decreases in more complicated motion sequences (i.e., motion vector median prediction out of bounds).

SUMMARY OF THE INVENTION

An object of the present invention is to provide a method for motion vector coding that substantially obviates one or more of the limitations and disadvantages of the related art.

Another object of the present invention is to provide a method for motion vector coding of an MPEG-4 that decreases an overall bit rate.

A further objective of the present invention is to provide a method of motion vector coding by finding a motion vector having a minimum difference from an actual motion vector among three motion vector candidates and transmitting the value of motion vector candidate found and a mode bit.

To achieve at least these objects and other advantages in a whole or in parts, and in accordance with the purpose of the present invention as embodied and broadly described, a method for motion vector coding of an MPEG-4 includes selecting a candidate that has a minimum bit rate when being coded among three motion vector candidates; sending a motion vector prediction error and prediction mode information to a decoder; estimating a minimum bit rate for coding a motion vector difference; and coding a motion vector against components X and Y, using a minimum rate predictor.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

According to a preferred embodiment of the present invention, one motion vector candidate having the minimum bit rate when being coded is selected out of a plurality motion vector candidates. A motion vector prediction error, which is a difference between an actual motion vector and a predicted motion vector, and prediction mode information are sent to a decoder. The number of motion vector candidates is preferably three for each of four blocks in a 16×16 macroblock using an 8×8 mode. However, the present invention is not intended to be limited to this. In addition, a bit rate in coding the difference of motion vectors can be easily estimated, for example, by subtracting the minimum rate motion vector of the candidates from the motion vector of the relevant block for a given component.

Figure 4:
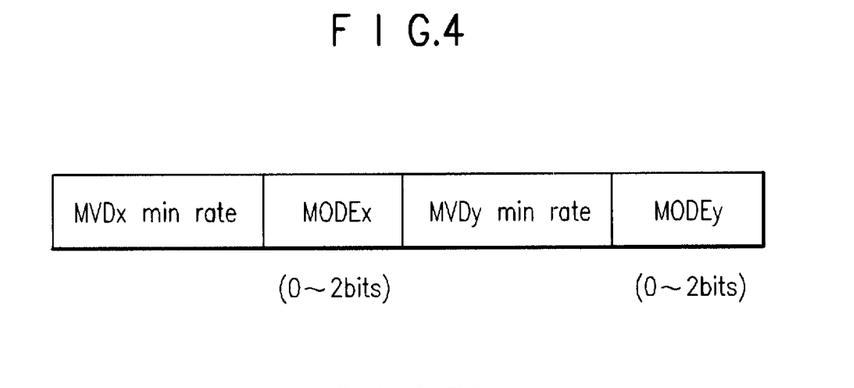
FIG. 4 is a diagram showing MVD code bits and a bitstream syntax of a mode bit according to a preferred embodiment of the present invention.

FIG. 4 is a diagram that shows an exemplary MVD code bits and a bitstream syntax of a mode bit according to the preferred embodiment of the present invention. Motion vector coding is performed against X and Y. The mode bit indicates which candidate is used among three motion vector candidates in coding an MVD. An MVD minimum rate preceding the mode bit as shown in FIG. 4 can be decreased using MVD minimum bit information. The motion vector X using a minimum rate predictor to determine the MVD minimum rate is preferably determined or coded as follows. The component Y (brightness) can be coded or determined in a similar manner.

MR_MVD_coding($MV_X$_code, *vlc_mag, *residual, *bitstream)
{
/*Find the minimum rate predictor among three neighboring candidates*/
$R1_X$=RATE($MV_X$-$MV1_X$)
$R2_X$=RATE($MV_X$-$MV2_X$)
$R3_X$=RATE($MV_X$-$MV3_X$)
$R_X$_min=MIN($R1_X$, $R2_X$, $R3_X$)
$P_X$_min_rate=$MVi_X$corresponding to $R_X$_min
/*At the same rate, the median has the highest priority for $P_X$_min rate*/
$MVD_X$_min_rate=$MVi_X$-$P_{X\min}$_rate
/*Coding $MVD_X$_min_rate*/
MVD_encoding ($MVD_X$_min_$_{rate, f}$_code, vlc_code_mag, residual, bitstream)
}

As shown above, motion vector (MV) is a two dimensional vector for compensating a motion, in which coordinative offsets of a current picture or field from a reference, or a previous frame or field are given. Variable length coding (vlc) assigns a short code to a frequently occurring data and assigns a long code to an infrequently occurring data, both of which are decodable. Bitstream is a series of bits of coded data.

Since an amount of bits to be transmitted is too much if motion vectors are transmitted as they are, only portion of the motion vectors that is different from just prior macroblock is transmitted after subjecting to a VLC coding. In a motion estimation by an encoder, a motion vector should be obtained using in general a block matching, for which a search range should be determined in advance. The encoder informs such a search range as f_code to the decoder, and the decoder can know such a search range upon detecting the f_code. The parameter of f_code is determined depending on an extent of the search range of the motion vector. A searched motion vector is not transmitted as it is, but transmitted using the f_$_{code}$.

Figure 5A:
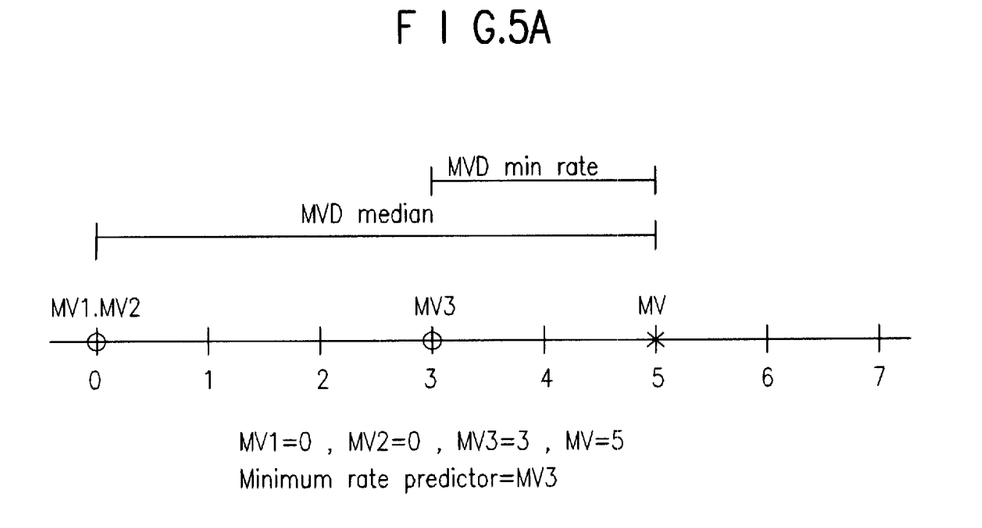
FIGS. 5a and 5b are diagrams showing exemplary codings where mode bits decrease in an encoder and decoder according to a preferred embodiment of the present invention.
Figure 5B:
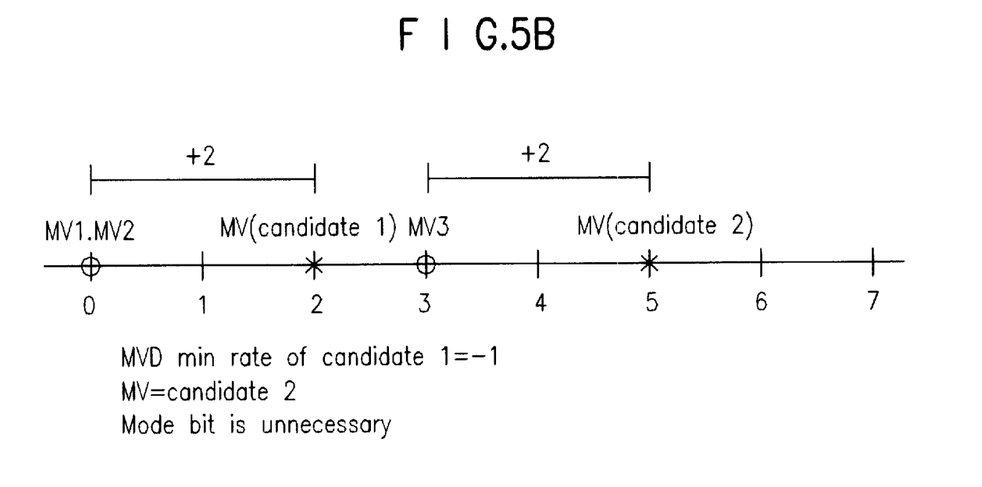

FIGS. 5a and 5b show examples where mode bits respectively decrease in an encoder and decoder according to the preferred embodiment of the present invention.

FIG. 5a relates to the encoder. Assuming that MV1=0, MV2=0, MV3=3, and a motion vector of a current block, MV=5, MV3 is closer to MV relative to MV1 or MV2. In other words, MV1 and MV2 are farther from MV5. Thus, MV3 is selected as a motion vector candidate. At this time, MVD minimum rate (MVD_min_rate) is 2.

As described above, the encoder codes MVD_min_rate using the minimum rate predictor. The encoder then determines if the decoder can detect an actual motion vector using minimum information.

As shown in FIG. 5b, which relates to the decoder, only two candidates exist according to the preferred embodiment of the present invention. However, a result of decoding candidate 1 with MVD_min_rate, which is received from the encoder, is different from a result of decoding it with an actual MVD_min_rate, which was assumed to be MV=5 above. Thus, it is concluded that the candidate 1 is not an actual motion vector. In this case, there is no need to send a mode bit to the decoder for finding an actual motion vector out of three motion vector candidates. Cases other than FIGS. 5A–5B require a mode bit.

An exemplary coding processing for the motion vector coding method according to the preferred embodiment of the present invention is as follows.

max=MAX($MV1_X$, $MV2_X$, $MV3_X$)
min=MIN($MV1_X$, $MV2_X$, $MV3_X$)
inside_mv_cnt=the number of neighboring candidates whose corresponding blocks are inside of the Video Object Profile (VOP)
THR=a prescribed threshold value
distinct_mv_cnt=the number of distinct neighboring candidates.
/*(e.g., distinct_mv_cnt=2, if $MV1_X$=0, $MV2_X$=0, and $MV3_X$=3)*/
if (|max-min|>=THR && inside_mv_cnt>=2&& distinct_mv_cnt==3)

```
{/*Minimum rate prediction is applied*/
/*Minimum rate prediction and the corresponding
    MVD_X_min_rate coding*/
    MR_MVD_coding (MV_X, f_code, &vlc_code mag,
        &residual, bs);
/*Determine MODE*/
/*Step 1: Evaluate three MV candidates.*/
Candidate1_X=MVD_decoding (f_code, vlc_code_mag,
    residual, MV1_X)
Candidate2_X=MVD_decoding (f_code, vlc_code_mag,
    residual, MV2_X)
Candidate3_X=MVD_decoding (f_code, vic_code_mag,
    residual, MV3_X)
/*Step2: Check if "vlc_code mag_ts" and "resulting
    from Candidate i_X(i=1, 2, and 3) encoding", have the
    same values as "vlc_code_mag" and "residual",
    respectively,*/
Candidate_num=0          /*set Candidatenum to zero */
MR_MVD_coding (Candidate1x, f_code, &vlcc_
    code_mag, ts, &residual_ts,
if(vlc_code_mag, ts==vlc_code_mag, &&, residual_
    ts==residual)
candidatenum++;         /*increase candidatenum by one
    */
MR_MVD_coding(Candidate2x, f_code, &vlc_code_
    mag, ts, &residual_ts,
if (vlc_code_mag, ts==vlc_code_mag, &&, residual_
    ts==residual) candidatenum++;
MR_MVD_coding (Candidate3_X, f_code, &vlc_
    code_mag, ts, &residual_ts,
if (vlc_code_mag, ts==vlc_code_mag, &&, residual_
    ts==residual) candidatenum++;
/*Step3: Determine the MODE_X and code it.*/
if (candidate_num==1)
    No bit allocated for MODE_X;
else if (candidate_num==2)
    1 bit for MODE_X;
else if (candidate_num==3)
    1 or 2 bit for MODE_X;
}
else
{ /*Median prediction is applied.*/
    No bit allocated for MODE_X;
}
```

As shown above, "=" denotes an assignment and "==" denotes a relational operator representing "the same". The bit operator representing "AND bit by bit" is "&", while the logic operator representing "a logical AND" is "&&". Further, explanatory remarks or comments are indicated by "/*".

Since an amount of bits to be transmitted is too much if motion vectors are transmitted as they are, only portion of the motion vectors that is different from just prior macroblock is transmitted after subjecting to a VLC coding. In a motion estimation by an encoder, a motion vector should be obtained using in general a block matching, for which a search range should be determined in advance. The encoder informs such a search range as f_code to the decoder, and the decoder can know such a search range upon detecting the f_code. The parameter of f_code is determined depending on an extent of the search range of the motion vector. A searched motion vector is not transmitted as it is, but transmitted using the f_code. In a receiver, the motion vector is decoded separating the motion vector into a motion_code and a motion_residual using the f_code.

The International Standard ISO/IEC 13818, which describes the coded representation of video data and the decoding process required to reconstruct the picture, is hereby incorporated by reference.

Figure 6:
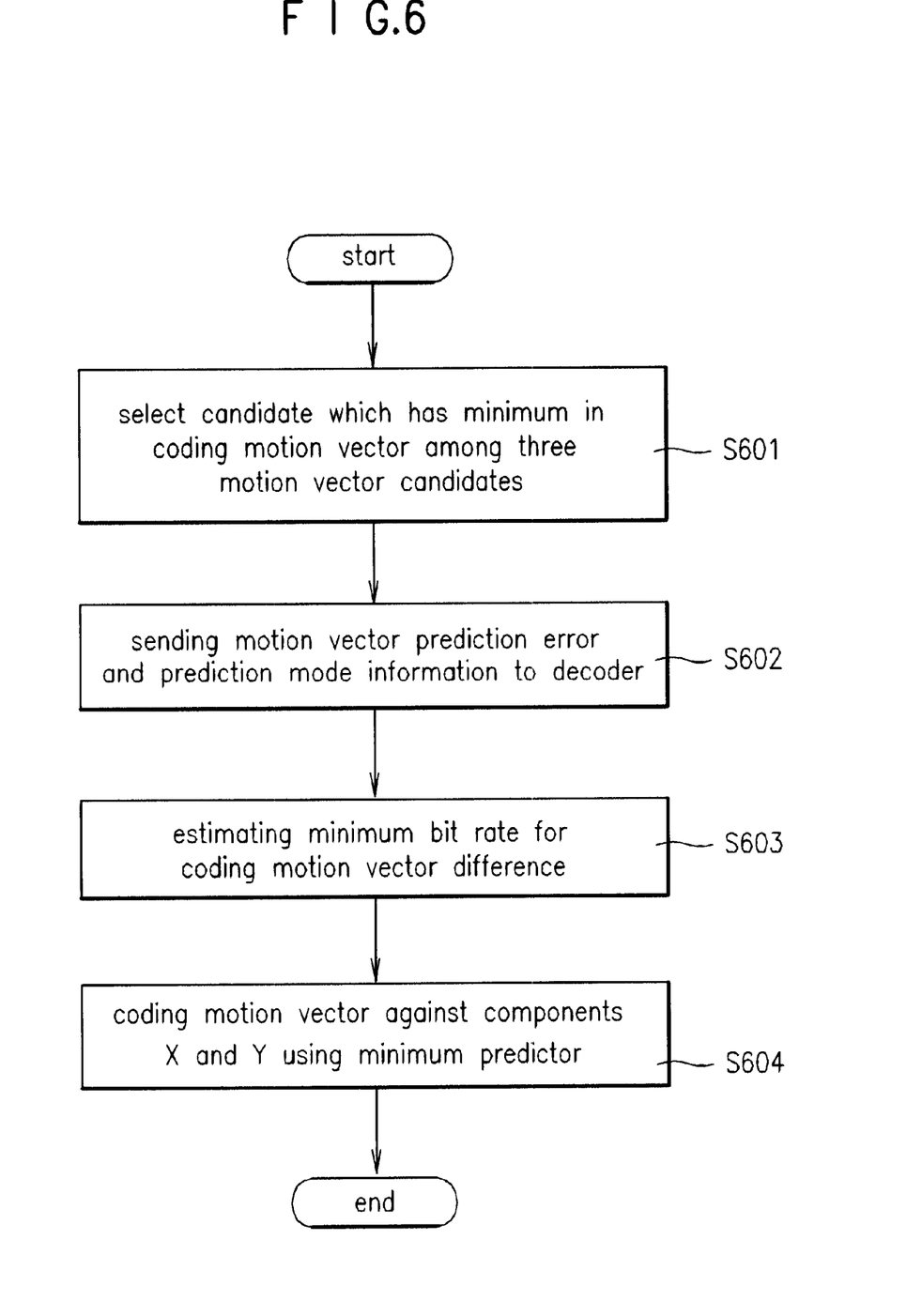
FIG. 6 is a flow chart showing a preferred embodiment of motion vector coding according to the present invention.

The preferred embodiment method for motion vector coding of an MPEG-4 according to the present invention will now be described with reference to the flow chart shown in FIG. 6. After the process begins in FIG. 6, control continues to step S601. In step S601, a candidate having a minimum coding bit rate selected out of a plurality (e.g., three) motion vector candidates. From step S601, control continues to step S602.

In step S602, a motion vector prediction error (e.g., MVD minimum rate) and prediction mode information (e.g., mode) are sent to a decoder. The motion vector prediction error is difference between an actual motion vector and a predicted motion vector. From step S602, control continues to step S603. In step S603, a minimum bit rate for coding a motion vector difference is estimated. From step S603, control continues to step S604. In step S604, a motion vector is coded against components X and Y, using a minimum rate predictor. From step S604, the process ends and the motion vector coding is completed.

The method for motion vector coding of an MPEG-4 according to the preferred embodiment, has various advantages. The preferred embodiment decreases an overall bit rate by finding and selecting a candidate which has minimum difference from a motion vector out of neighboring motion vector candidates (e.g., three). The value of the selected motion vector candidate and a mode bit are then transmitted. Accordingly, a capability of compressing a motion picture is improved.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A method for motion vector coding comprising:
    selecting a candidate having a minimum coding bit rate from a plurality of motion vector candidates for a macroblock;
    sending a motion vector prediction error and prediction mode information for the macroblock to a decoder;
    estimating a minimum bit rate for coding a motion vector difference of the macroblock in the decoder; and
    coding a motion vector against a first component using a minimum rate predictor in the decoder, wherein the motion vector prediction error determines a subset of the plurality of motion vector candidates, and wherein the prediction mode information determines one of the subset of the plurality of candidates used in coding the motion vector difference for coding a motion vector.

2. The method according to claim 1, wherein coding the motion vector against the first component uses the following equation:

$$MR\_MVD\_coding(MV_{X\_code}, *vlc_{\_mag}, *residual, *bitstream)$$

{
    /*Find the minimum rate predictor among three neighboring candidate,*/
    $R1_X$=RATE($MV_X$−$MV1_X$)

$R2_X$=RATE $(MV2_X-MV2_X)$ $R3_X$=RATE$(MV_X-MV3_X)$ $R_X\_min$=MIN$(R1_X, R2_X, R3_X)$ $P_X\_min\_rate$=$MVi_X$ corresponding to $R_X\_min$ (At the same rate, the median has the highest priority for $P_X\_min\_rate$)

$MVD_X\_min\_rate$=$MV_X-P_X\_min\_rate$

/*Coding $MVD_X\_min\_rate$

MVD_encoding($MVD_X\_min\_rate$, f_code, vlc_code_mag, residual, bitstream);

}.

3. The method according to claim 1, further comprising coding a motion vector against a second component using the minimum rate predictor, wherein the first and second components are X and Y components.

4. The method according to claim 1, wherein the prediction mode information designates the selected candidate having the minimum coding bit rate.

5. The method according to claim 1, wherein the sending step further comprises:

subtracting a motion vector corresponding to each of the plurality of candidates from a current motion vector; and selecting the smallest value as the motion vector prediction error.

6. The method according to claim 1, wherein the estimating a minimum bit rate for coding a motion vector difference step comprises selecting the motion vector of the candidate motion vectors that corresponds to the minimum rate predictor.

7. The method according to claim 1, wherein the motion vector prediction error and the prediction mode information indicate which single one of the plurality of motion vector candidates to use in decoding the macroblock.

8. The method according to claim 1, wherein the decoding a motion vector against a first component comprises:

determining a rate predictor value for each of the plurality of motion vector candidates;

determining a minimum rate predictor among the plurality of rate predictor values;

setting a minimum rate predictor value to the corresponding motion vector candidate according to the minimum rate predictor for the first component;

setting a motion vector difference minimum rate using the relationship between the motion vector of the current block and-the minimum rate predictor value; and coding the motion vector difference using the motion vector difference minimum rate.

9. The method according to claim 1, wherein the estimating and the coding in the decoder use the motion vector prediction error and the prediction mode information determined in an encoder.

10. A method for motion vector coding comprising:

selecting a candidate having a minimum coding bit rate from a plurality of motion vector candidates for a macroblock;

sending a motion vector prediction error and prediction mode information for the macroblock to a decoder;

estimating a minimum bit rate for coding a motion vector difference of the macroblock in the decoder; and coding a motion vector against a first component using a minimum rate predictor in the decoder, wherein coding the motion vector against the first component uses the following equation:

MR_MVD_coding($MV_X\_code$, *vlc_mag, *residual, *bitstream)

{

/*Find the minimum rate predictor among three neighboring candidate,*/

$R1_X$=RATE$(MV_X-MV1_X)$ $R2_X$=RATE$(MV_X-MV2_X)$ $R3_X$=RATE$(MV_X-MV3_X)$ $R_X\_min$=MIN$(R1_X, R2_X, R3_X)$ $P_X\_min\_rate$=$MVi_X$ corresponding to $R_X\_min$ (At the same rate, the median has the highest priority for $P_X\_min\_rate$)

$MVD_X\_min\_rate$=$MV_X-P_X\_min_{rate}$

/*Coding $MVD_X\_min\_rate$

MVD_encoding($MVD_X\_min\_rate$, f_code, vlc_code_mag, residual, bitstream);

}.

11. A method for motion vector encoding comprising:

identifying a plurality of motion vector candidates for a current block of a macroblock;

selecting one of a minimum rate prediction mode and a median prediction mode for the current block;

selecting a candidate having a minimum coding bit rate from the plurality of motion vector candidates for the minimum rate prediction mode;

determining a motion vector prediction error and prediction mode information as encoded information for the minimum rate prediction mode;

determining the encoded information for the median prediction mode; and transmitting the encoded information, wherein the minimum rate prediction mode selects one of the plurality of motion vector candidates to decode the current block, and wherein the median prediction mode uses a combination of the plurality of motion vector candidates as a motion vector to decode the current block.

12. The method according to claim 11, wherein the determining a motion vector prediction error step comprises:

subtracting a motion vector corresponding to each of the plurality of candidates from the current motion vector; and selecting the smallest value as the motion vector prediction error.

13. The method according to claim 11, wherein the prediction mode information identifies a selected candidate of the plurality of candidates.

14. The method according to claim 11, wherein the prediction mode information selects one of the plurality of motion vector candidates used in coding a motion vector difference.

15. The method according to claim 11, wherein the transmitted motion vector prediction error and prediction mode information is used in coding the motion vector against the first component using a minimum rate predictor determined by the following equation:

MR_MVD_coding($MV_X\_code$, *vlc_mag, *residual, *bitstream)

=/*Find the minimum rate predictor among three neighboring candidate,*/

$R1_X$=RATE$(MV_X-MV1_X)$ $R2$=RATE$(MV_X-MV2_X)$ $R3_X$=RATE$(MV_X-MV3_X)$ $R_{X\_min} = MIN(R1_X, R2_X, R3_X)$ $P_{X\_min\_rate} = MVi_X$ corresponding to $R_{X\_min}$ (At the same rate, the median has the highest priority for $P_{X\_min}$ rate)

$MVD_{X\_min\_rate} = MVi_X - P_{X\_min\_rate}$

/*Coding $MVD_{X\_min\_rate}$

MVD_encoding($MVD_{X\_min}$ rate, f_code, vlc_code_mag, residual, bitstream);

}.

16. A method for motion vector decoding comprising:

receiving a motion vector prediction error and prediction mode information for a macroblock as encoded information for a minimum rate prediction mode in a decoder;

estimating a minimum bit rate for coding a motion vector difference for the macroblock in the decoder; and coding a motion vector for the current block against a first component using a minimum rate predictor for the macroblock in the decoder, wherein the motion vector prediction error determines a subset of the plurality of motion vector candidates, and wherein the prediction mode information determines one of the subset of the plurality of candidates used in coding the motion vector difference.

17. The method according to claim 16, further comprising coding a motion vector against a second component using the minimum rate predictor, wherein the first and second components are X and Y components.

18. The method according to claim 16, wherein the prediction mode information designates a selected candidate having the minimum coding bit rate.

19. The method according to claim 16, wherein the estimating a minimum bit rate for coding a motion vector difference step comprises selecting the motion vector of the candidate motion vectors that corresponds to the minimum rate predictor.

20. The method according to claim 16, further comprising coding the motion vector for the current block against the first component using a median prediction motion vector for a median prediction mode.

21. The method according to claim 16, wherein the decoding a motion vector against a first component comprises:

determining a rate predictor value for each of the plurality of motion vector candidates;

determining a minimum rate predictor among the plurality of rate predictor values;

setting the minimum rate predictor value to the corresponding motion vector candidate according to the minimum rate predictors for the first component;

setting a motion vector difference minimum rate using the relationship between the motion vector of the current block and the minimum rate predictor value; and coding the motion vector difference using the motion vector difference minimum rate.

22. The method according to claim 16, wherein the estimating and the coding in the decoder use the motion vector prediction error and the prediction mode information determined in an encoder.

23. A method for motion vector coding comprising:

selecting a candidate having a minimum coding bit rate from a plurality of motion vector candidates for a macroblock;

sending a motion vector prediction error and prediction mode information for the macroblock to a decoder;

estimating a minimum bit rate for coding a motion vector difference of the macroblock in the decoder; and coding a motion vector against a first component using a minimum rate predictor in the decoder, wherein the coding a motion vector against a first component comprises, determining a rate predictor value for each of the plurality of motion vector candidates, determining a minimum rate predictor among the plurality of rate predictor values, setting the minimum rate predictor value to the corresponding motion vector candidate according to the minimum rate predictor for the first component, setting a motion vector difference minimum rate using the relationship between the motion vector of the current block and the minimum rate predictor value, and coding the motion vector difference using the motion vector difference minimum rate.

24. A method for motion vector decoding comprising:

receiving a motion vector prediction error and prediction mode information for a macroblock as encoded information for a minimum rate prediction mode in a decoder;

estimating a minimum bit rate for coding a motion vector difference for the macroblock in the decoder; and coding a motion vector for the current block against a first component using a minimum rate predictor for the macroblock in the decoder, wherein the decoding a motion vector against a first component comprises, determining a rate predictor value for each of the plurality of motion vector candidates, determining the minimum rate predictor among the plurality of rate predictor values, setting a minimum rate predictor value to the corresponding motion vector candidate according to the minimum rate predictors for the first component, setting a motion vector difference minimum rate using the relationship between the motion vector of the current block and the minimum rate predictor value, and coding the motion vector difference using the motion vector difference minimum rate.

* * * * *